(12) United States Patent
Saul et al.

(10) Patent No.: US 10,338,753 B2
(45) Date of Patent: Jul. 2, 2019

(54) FLEXIBLE MULTI-LAYER SENSING SURFACE

(71) Applicant: Microsoft Technology Licensing, LLC, Redmond, WA (US)

(72) Inventors: Greg Saul, Cambridge (GB); Daniel Cletheroe, Stapleford (GB); Nicolas Villar, Cambridge (GB); Haiyan Zhang, Cambridge (GB); Oscar Salandin, London (GB); Christian Holz, Seattle, WA (US); Andrew Fitzgibbon, Cambridge (GB); Stephen Edward Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 15/231,757

(22) Filed: Aug. 8, 2016

(65) Prior Publication Data

US 2017/0123531 A1    May 4, 2017

Related U.S. Application Data

(63) Continuation-in-part of application No. 14/931,049, filed on Nov. 3, 2015.

(51) Int. Cl.
*G06F 3/044* (2006.01)
*H01Q 1/24* (2006.01)
(Continued)

(52) U.S. Cl.
CPC .............. *G06F 3/044* (2013.01); *G06F 3/041* (2013.01); *G06F 3/0418* (2013.01); *H01Q 1/241* (2013.01);
(Continued)

(58) Field of Classification Search
CPC ........ G06F 3/044; G06F 3/0418; G06F 3/041; G06F 2203/04102; G06F 2203/04106;
(Continued)

(56) References Cited

U.S. PATENT DOCUMENTS

| 2,170,373 A | 8/1939 | Kind |
| 5,214,427 A | 5/1993 | Yano |

(Continued)

FOREIGN PATENT DOCUMENTS

| CN | 202795320 U | 3/2013 |
| CN | 104992595 A | 10/2015 |

(Continued)

OTHER PUBLICATIONS

MacLeod, Peter, "A Review of Flexible Circuit Technology and its Applications", Published on: Jun. 2002, 59 pages Available at: http://www.lboro.ac.uk/microsites/mechman/research/ipm-ktn/pdf/Technology_review/flexible-circuit-technology-and-its-applications.pdf.

(Continued)

*Primary Examiner* — Patrick N Edouard
*Assistant Examiner* — Joseph P Fox

(57) ABSTRACT

A flexible multi-layer sensing surface comprises a first flexible layer and a second flexible layer. The first flexible layer is a sensing layer and the second sensing layer is another sensing layer or an output layer. The sensing surface also comprises a calibration module which is configured to use the first flexible sensing layer to detect the relative position of the first and second flexible layers and this detected relative position is then used to update one or more stored operating parameters.

20 Claims, 9 Drawing Sheets

(51) Int. Cl.
*H01Q 1/48* (2006.01)
*H01Q 7/00* (2006.01)
*H04W 4/80* (2018.01)
*G06F 3/041* (2006.01)
*H01Q 21/00* (2006.01)
*H01Q 21/06* (2006.01)
*H01Q 21/08* (2006.01)

(52) U.S. Cl.
CPC ............... *H01Q 1/48* (2013.01); *H01Q 7/00* (2013.01); *H01Q 21/00* (2013.01); *H01Q 21/061* (2013.01); *H01Q 21/08* (2013.01); *H04W 4/80* (2018.02); *G06F 2203/04102* (2013.01); *G06F 2203/04106* (2013.01)

(58) Field of Classification Search
CPC ....... H04W 4/80; H01Q 21/061; H01Q 21/08; H01Q 7/00; H01Q 21/00; H01Q 1/48; H01Q 1/241
See application file for complete search history.

(56) References Cited

U.S. PATENT DOCUMENTS

| | | | |
|---|---|---|---|
| 5,355,105 A | 10/1994 | Angelucci | |
| 5,521,601 A | 5/1996 | Kandlur et al. | |
| 5,623,129 A | 4/1997 | Mallicoat | |
| 6,062,937 A | 5/2000 | Kikuchi | |
| 6,118,379 A | 9/2000 | Kodukula et al. | |
| 6,204,764 B1 | 3/2001 | Maloney | |
| 6,366,260 B1 | 4/2002 | Carrender | |
| 6,407,665 B2 | 6/2002 | Maloney | |
| 6,443,796 B1 | 9/2002 | Shackelford | |
| 6,454,624 B1 | 9/2002 | Duff et al. | |
| 6,585,165 B1 | 7/2003 | Kuroda et al. | |
| 6,668,447 B2 | 12/2003 | Samant et al. | |
| 6,750,769 B1 | 6/2004 | Smith | |
| 6,773,322 B2 | 8/2004 | Gabai et al. | |
| 6,834,251 B1 | 12/2004 | Fletcher | |
| 6,903,056 B2 | 6/2005 | Nagano et al. | |
| 6,903,656 B1 | 6/2005 | Lee | |
| 7,058,434 B2 | 6/2006 | Wang et al. | |
| 7,310,045 B2 | 12/2007 | Inui | |
| 7,372,967 B2 | 5/2008 | Henson et al. | |
| 7,413,124 B2 | 8/2008 | Frank et al. | |
| 7,432,855 B2 | 10/2008 | Mohamadi | |
| 7,439,972 B2 | 10/2008 | Timcenko | |
| 7,488,231 B2 | 2/2009 | Weston | |
| 7,639,237 B2 | 12/2009 | Perkins | |
| 7,821,274 B2 | 10/2010 | Philipp et al. | |
| 7,859,408 B2 | 12/2010 | Tuttle | |
| 7,977,577 B2 | 7/2011 | Lee | |
| 8,079,890 B2 | 12/2011 | Seligman | |
| 8,257,157 B2 | 9/2012 | Polchin | |
| 8,292,733 B2 | 10/2012 | Crawford et al. | |
| 8,463,332 B2 | 6/2013 | Sato et al. | |
| 8,523,185 B1 | 9/2013 | Gilbreath et al. | |
| 8,550,916 B2 | 10/2013 | Raynal | |
| 8,579,196 B1 | 11/2013 | Lowe | |
| 8,670,711 B2 | 3/2014 | Fine et al. | |
| 8,743,086 B2 | 6/2014 | Chen et al. | |
| 8,749,390 B2 | 6/2014 | Eray | |
| 8,803,661 B2 | 8/2014 | Kaaja et al. | |
| 8,970,537 B1 | 3/2015 | Shepelev et al. | |
| 8,982,094 B2 | 3/2015 | Pi et al. | |
| 9,004,976 B2 | 4/2015 | Rosenberg | |
| 9,007,306 B2 | 4/2015 | Liu | |
| 9,011,327 B2 | 4/2015 | Schenk | |
| 9,022,575 B2 | 5/2015 | Hsu | |
| 9,028,312 B1 | 5/2015 | Wei et al. | |
| 9,088,862 B2 | 7/2015 | Jalkanen et al. | |
| 9,111,164 B1 | 8/2015 | Anderton et al. | |
| 9,152,832 B2 | 10/2015 | Royston et al. | |
| 9,168,464 B2 | 10/2015 | Karunaratne | |
| 9,229,563 B2 | 1/2016 | Park | |
| 9,269,588 B2 | 2/2016 | Xu et al. | |
| 9,270,337 B2 | 2/2016 | Zhu et al. | |
| 9,270,344 B2 | 2/2016 | Rosenberg | |
| 9,274,562 B2 | 3/2016 | Franklin et al. | |
| 9,627,753 B2 | 4/2017 | Caimi et al. | |
| 9,914,066 B2 | 3/2018 | Cletheroe et al. | |
| 9,933,891 B2 | 4/2018 | Saul et al. | |
| 10,133,889 B2 | 11/2018 | Daniel et al. | |
| 2002/0106995 A1 | 8/2002 | Callaway, Jr. | |
| 2002/0185981 A1 | 12/2002 | Dietz et al. | |
| 2002/0196250 A1 | 12/2002 | Anderson et al. | |
| 2003/0148700 A1 | 8/2003 | Arlinsky et al. | |
| 2003/0178291 A1 | 9/2003 | Schilling | |
| 2004/0124248 A1 | 7/2004 | Selker | |
| 2005/0134506 A1 | 6/2005 | Egbert | |
| 2005/0183264 A1 | 8/2005 | Eckstein et al. | |
| 2005/0242950 A1 | 11/2005 | Lindsay et al. | |
| 2007/0062852 A1 | 3/2007 | Zachut et al. | |
| 2008/0184281 A1 | 7/2008 | Ashizaki et al. | |
| 2008/0186174 A1 | 8/2008 | Alexis et al. | |
| 2008/0238685 A1 | 10/2008 | Tuttle | |
| 2008/0238885 A1 | 10/2008 | Zachut et al. | |
| 2008/0246614 A1 | 10/2008 | Paananen | |
| 2009/0027210 A1 | 1/2009 | Sakama et al. | |
| 2009/0029771 A1 | 1/2009 | Donahue | |
| 2009/0167699 A1 | 7/2009 | Rosenblatt et al. | |
| 2010/0001923 A1 | 1/2010 | Zilber | |
| 2010/0053111 A1 | 3/2010 | Karlsson | |
| 2010/0267421 A1 | 10/2010 | Rofougaran | |
| 2011/0227871 A1 | 9/2011 | Cannon | |
| 2011/0263297 A1 | 10/2011 | Kaaja et al. | |
| 2011/0273382 A1 | 11/2011 | Yoo et al. | |
| 2012/0062490 A1 | 3/2012 | Heatherly et al. | |
| 2012/0075199 A1 | 3/2012 | Hsieh | |
| 2012/0146770 A1 | 6/2012 | Brannen et al. | |
| 2012/0162032 A1 | 6/2012 | Yang et al. | |
| 2012/0258436 A1 | 10/2012 | Lee | |
| 2013/0044078 A1 | 2/2013 | Hallenberg et al. | |
| 2013/0078914 A1 | 3/2013 | Royston et al. | |
| 2013/0155005 A1 | 6/2013 | Liang | |
| 2013/0176175 A1 | 7/2013 | Zusman et al. | |
| 2013/0181937 A1 | 7/2013 | Chen et al. | |
| 2013/0194071 A1 | 8/2013 | Slogedal et al. | |
| 2013/0194230 A1 | 8/2013 | Kawaguchi et al. | |
| 2013/0196596 A1 | 8/2013 | Parekh et al. | |
| 2013/0207938 A1 | 8/2013 | Ryshtun et al. | |
| 2013/0217295 A1 | 8/2013 | Karunaratne | |
| 2013/0231046 A1 | 9/2013 | Pope et al. | |
| 2013/0234734 A1 | 9/2013 | Iida et al. | |
| 2013/0278540 A1 | 10/2013 | Yilmaz | |
| 2014/0029017 A1 | 1/2014 | Lee et al. | |
| 2014/0043248 A1 | 2/2014 | Yeh et al. | |
| 2014/0092054 A1 | 4/2014 | Ng | |
| 2014/0104188 A1 | 4/2014 | Bakken et al. | |
| 2014/0127995 A1 | 5/2014 | Hendricksen et al. | |
| 2014/0139347 A1 | 5/2014 | Forster | |
| 2014/0148095 A1 | 5/2014 | Smith et al. | |
| 2014/0160692 A1* | 6/2014 | Lau .......................... H05K 3/36 361/736 |
| 2014/0176819 A1 | 6/2014 | Yilmaz | |
| 2014/0187153 A1 | 7/2014 | Zhu et al. | |
| 2014/0217176 A1 | 8/2014 | Baldischweiler et al. | |
| 2014/0240100 A1 | 8/2014 | Johns | |
| 2014/0283809 A1 | 9/2014 | Huebl | |
| 2014/0340347 A1 | 11/2014 | Tenuta | |
| 2014/0342663 A1 | 11/2014 | Eaton et al. | |
| 2014/0347244 A1 | 11/2014 | Pagani et al. | |
| 2015/0049063 A1 | 2/2015 | Smith et al. | |
| 2015/0062045 A1 | 3/2015 | White et al. | |
| 2015/0084650 A1 | 3/2015 | Zachut et al. | |
| 2015/0090242 A1 | 4/2015 | Weston et al. | |
| 2015/0138025 A1 | 5/2015 | Horikoshi et al. | |
| 2015/0169011 A1 | 6/2015 | Bibl et al. | |
| 2015/0169122 A1 | 6/2015 | Kulik et al. | |
| 2015/0193052 A1 | 7/2015 | Fuller et al. | |
| 2015/0220184 A1 | 8/2015 | Park et al. | |
| 2015/0242012 A1 | 8/2015 | Petcavich et al. | |
| 2015/0258435 A1 | 9/2015 | Zhang et al. | |
| 2015/0258459 A1 | 9/2015 | Scott et al. | |

(56) References Cited

U.S. PATENT DOCUMENTS

| | | | |
|---|---|---|---|
| 2015/0277617 | A1 | 10/2015 | Gwin et al. |
| 2015/0290536 | A1 | 10/2015 | Schumacher |
| 2016/0043752 | A1 | 2/2016 | Slater et al. |
| 2016/0087693 | A1 | 3/2016 | Shimomura et al. |
| 2016/0101370 | A1 | 4/2016 | Madsen et al. |
| 2016/0124574 | A1 | 5/2016 | Rouaissia et al. |
| 2016/0190851 | A1 | 6/2016 | Pudipeddi et al. |
| 2017/0074966 | A1 | 3/2017 | Pirc et al. |
| 2017/0123561 | A1 | 5/2017 | Saul et al. |
| 2017/0123562 | A1 | 5/2017 | Cletheroe et al. |
| 2017/0123563 | A1 | 5/2017 | Saul et al. |
| 2017/0124364 | A1 | 5/2017 | Villar et al. |
| 2017/0132438 | A1 | 5/2017 | Cletheroe et al. |
| 2017/0252664 | A1 | 9/2017 | Cletheroe et al. |

FOREIGN PATENT DOCUMENTS

| | | | |
|---|---|---|---|
| EP | 1271415 | A1 | 1/2003 |
| EP | 2172834 | A2 | 4/2010 |
| EP | 2535797 | A2 | 12/2012 |
| EP | 2620845 | A1 | 7/2013 |
| EP | 2741183 | A1 | 6/2014 |
| EP | 2208390 | B1 | 2/2015 |
| EP | 2837651 | A1 | 2/2015 |
| WO | 02095674 | A1 | 11/2002 |
| WO | 2007094993 | A1 | 8/2007 |
| WO | 2008147820 | A1 | 12/2008 |
| WO | 2009142383 | A1 | 11/2009 |
| WO | 2010150232 | A1 | 12/2010 |
| WO | 2014067547 | A1 | 5/2014 |
| WO | WO 2015/131746 | A2 * | 11/2015 |
| WO | 2016055290 | A2 | 4/2016 |

OTHER PUBLICATIONS

"Multilayer Circuits", Retrieved on: Jul. 7, 2016, 1 page Available at: http://www.minco.com/components/Home/Flex-Circuits/Product-Technologies/Multilayer.

U.S. Appl. No. 14/931,049, Villar, et al., "Multi-Modal Sensing Surface", filed Nov. 3, 2015.

"Project Jacquard", Retrieved on: Jul. 13, 2016, 13 pages Available at: https://atap.google.com/jacquard/.

"Satzuma 26319 USB ROLL UP Flexible Keyboard, PC / Mac, Keyboard", Published on: Sep. 23, 2010, 5 pages Available at: https://www.amazon.co.uk/Satzuma-26319-ROLL-Flexible-Keyboard/dp/B00446YLCE.

"Roll-Up Piano", Retrieved on: Jul. 13, 2016, 6 pages Available at: http://www.specialneedstoys.com/uk/communication/musical-instruments/roll-up-piano-musical-instrument-toy.html?utm_campaign=gshopping&utm_source=web&utm_medium=ppc&gclid=COOI9dintc0CFdUW0wodt6YL0g.

Blass, Evan, "Samsung will reportedly launch devices with foldable and rollable screens in 2017", Published on: Jun. 7, 2016, 7 pages Available at: http://venturebeat.com/2016/06/07/samsung-will-reportedly-launch-devices-with-foldable-and-rollable-screens-in-2017/.

Opam, Kwame, "LG's rollable display is a crazy prototype from a still-distant future", Published on: Jan. 5, 2016, 3 pages Available at: http://www.theverge.com/2016/1/5/10720838/lg-18-inch-rollable-display-prototype-hands-on-ces-2016.

"International Search Report and Written Opinion Issued in PCT Application No. PCT/US2016/059806", dated Mar. 3, 2017, 14 Pages.

"Second Written Opinion Issued in PCT Application No. PCT/US2016/059806", dated Oct. 17, 2017, 8 Pages.

Vidales, Carlos E., "How to calibrate touch screens", In Proceedings of the Embedded Systems Programming vol. 15, Issue 6, May 31, 2002, 12 Pages.

"International Preliminary Report on Patentability Issued in PCT Application No. PCT/US2016/059806", dated Jan. 22, 2018, 10 Pages.

"AppMates", Retrieved from https://web.archive.org/web/20160701062447/http://www.appmatestoys.com/, Retrieved on: Jul. 13, 2016, 1 Page.

"Fisher Price", Retrieved from https://web.archive.org/web/20160712103809/http://service.mattel.com/instruction_sheets/Y3610a-0920.pdf, Retrieved on Jul. 12, 2016, 20 Pages.

"Imaginext® Apptivity™ Fortress", Retrieved from https://web.archive.org/web/20160326105733/http://www.fisher-price.com/shop/imaginext-apptivity-fortress-y3610, Retrieved on: Jul. 12, 2016, 8 Pages.

"Laser Tag", Retrieved from https://en.wikipedia.org/wiki/Laser_tag, Retrieved on: Jul. 12, 2016, 10 Pages.

"Lego Shop", Retrieved from http://shop.lego.com/en-US/LEGO-Fusion-Battle-Towers-21205, Retrieved on: Dec. 4, 2015, 2 Pages.

"Modular Robotics", Retrieved from https://www.modrobotics.com/cubelets/, Retrieved on: Dec. 4, 2015, 17 Pages.

"NFC EZ430 Reader Module Reference Design", Retrieved from http://www.ti.com/tool/TIDM-NFC-EZ430-MODULE, Sep. 24, 2014, 3 Pages.

"Super Scope", Retrieved from https://en.wikipedia.org/wiki/Super_Scope, Retrieved on: Jul. 12, 2016, 3 Pages.

"Advisory Action Issued in U.S. Appl. No. 14/931,049", dated Mar. 20, 2018, 7 Pages.

"Final Office Action Issued in U.S. Appl. No. 14/931,049", dated Oct. 4, 2017, 25 Pages.

"Non Final Office Action Issued in U.S. Appl. No. 14/931,049", dated Jun. 11, 2018, 27 Pages.

"Non Final Office Action Issued in U.S. Appl. No. 14/931,049", dated Apr. 7, 2017, 19 Pages.

"Non Final Office Action Issued in U.S. Appl. No. 15/063,258", dated Mar. 1, 2017, 9 Pages.

"Non Final Office Action Issued in U.S. Appl. No. 15/231,174", dated May 9, 2017, 22 Pages.

"Non Final Office Action Issued in U.S. Appl. No. 15/231,352", dated Feb. 23, 2018, 6 Pages.

"Non Final Office Action Issued in U.S. Appl. No. 15/231,655", dated Mar. 12, 2018, 16 Pages.

"Final Office Action Issued in U.S. Appl. No. 15/231,677", dated Sep. 18, 2018, 16 Pages.

"Non Final Office Action Issued in U.S. Appl. No. 15/231,677", dated Feb. 1, 2018, 17 Pages.

"Non Final Office Action Issued in U.S. Appl. No. 15/231,760", dated Mar. 8, 2018, 24 Pages.

Chan, et al., "CapStones and ZebraWidgets: Sensing Stacks of Building. Blocks, Dials and Sliders on Capacitive Touch Screens", In Proceedings of the SIGCHI Conference on Human Factors in Computing Systems, May 5, 2012, pp. 2189-2192.

EPAWN, "The Next Generation Gaming Experience, Motion Capture for 'Toys to Life' Games", Retrieved from http://epawn.fr/, Retrieved on: Oct. 10, 2016, 10 Pages.

Goh, et al., "The i-Cube: Design Considerations for Block-based Digital Manipulatives and Their Applications", In Proceedings of Designing Interactive Systems Conference, Jun. 11, 2012, 10 Pages.

Hardy, et al., "Touch & Interact: Touch-based Interaction of Mobile Phones with Displays", In Proceedings of 10th International Conference on Human Computer Interaction with Mobile Devices and Services, Sep. 2, 2008, pp. 245-254.

Ho, et al., "Coupled Data Communication Techniques for High-Performance and Low-Power Computing", In Book—Springer Science & Business Media, Jun. 3, 2010, pp. 51-77.

Holz, et al., "Biometric Touch Sensing: Seamlessly Augmenting Each Touch with Continuous Authentication", In Proceedings of the 28th Annual ACM Symposium on User Interface Software and Technology, Nov. 5, 2015, pp. 303-312.

Jennings, et al., "CONSTRUCT/VizM: A Framework for Rendering Tangible Constructions", In SIGARDI Conference, Nov. 17, 2010, pp. 415-418.

Kim, et al., "A Highly Sensitive Capacitive Touch Sensor Integrated on a Thin-Film-Encapsulated Active-Matrix OLEO or Ultrathin Displays", In Proceedings of IEEE Transactions on Electron Devices, vol. 58, Issue 10, Oct. 2011, pp. 3609-3615.

(56) References Cited

OTHER PUBLICATIONS

Kitamura, et al., "Real-time 3D Interaction with ActiveCube", In Proceedings of Extended Abstracts on Human Factors in Computing Systems, Mar. 31, 2001, pp. 355-356.

Kramer, Kwindla Hultman, "Moveable Objects, Mobile Cod", In Doctoral Dissertation, Massachusetts Institute of Technology, Aug. 7, 1998, 29 Pages.

Kranz, et al., "A Display Cube as a Tangible User Interface", In Proceedings of the Seventh International Conference on Ubiquitous Computing, Sep. 11, 2005, 2 Pages.

Kubitza, et al., "WebCiip: A Connector for Ubiquitous Physical Input and Output for Touch Screen Devices", In Proceedings of ACM International Joint Conference on Pervasive and Ubiquitous Computing, Sep. 8, 2013, 4 Pages.

"International Preliminary Report on Patentability Issued in PCT Application No. PCT/US2016/059804", dated Feb. 7, 2018, 10 Pages.

"International Search Report and Written Opinion Issued in PCT Application No. PCT/US2016/059804", dated Jan. 30, 2017, 14 Pages.

"Second Written Opinion Issued in PCT Application No. PCT/US2016/059804", dated Oct. 12, 2017, 6 Pages.

"International Search Report and Written Opinion Issued in PCT Application No. PCT/US2016/059805", dated May 9, 2017, 21 Pages.

"International Preliminary Report on Patentability Issued in PCT Application No. PCT/US2016/059807", dated Jan. 15, 2018, 16 Pages.

"International Search Report and Written Opinion Issued in PCT Application No. PCT/US2016/059807", dated Jan. 31, 2017, 13 Pages.

"Second Written Opinion Issued in PCT Application No. PCT/US2016/059807", dated Sep. 12, 2017, 5 Pages.

"International Search Report and Written Opinion Issued in PCT Application No. PCT/US2016/059808", dated May 8, 2017, 18 Pages.

"International Search Report and Written Opinion Issued in PCT Application No. PCT/US2016/059809", dated Feb. 27, 2017, 12 Pages.

"International Preliminary Report on Patentability Issued in PCT Application No. PCT/US2016/060274", dated Sep. 25, 2017, 5 Pages.

"International Search Report and Written Opinion Issued in PCT Application No. PCT/US2016/060274", dated Feb. 14, 2017, 10 Pages.

"International Search Report and written opinion Issued in PCT Application No. PCT/US2017/019796", dated Jun. 6, 2017, 11 Pages.

Puppendahl, et al., "Capacitive Near-Field Communication for Ubiquitous Interaction and Perception", In Proceedings of the ACM International Joint Conference on Pervasive and Ubiquitous Computing, Sep. 13, 2014, pp. 231-242.

Saenz, Aaron, "Siftables are Changing the Shape of Computing", Retrieved from https://singularityhub.com/2010/05/05/siftables-are-changing-the-shape-of-computing/#sm.
0001pok8sozeqfijt972n8z9t6bir, May 5, 2010, 4 Pages.

Schweikardt, et al., "RoBlocks: a Robotic Construction Kit for Mathematics and Science Education", In Proceedings of the 8th International Conference on Multimodal Interfaces, Nov. 2, 2006, pp. 72-75.

Vu, et al., "Distinguishing Users with Capacitive Touch Communication", In Proceedings of the 18th Annual International Conference on Mobile Computing and Networking, Aug. 22, 2012, 12 Pages.

Watanabe, et al., "The Soul of ActiveCube—Implementing a Flexible, Multimodal, Three-Dimensional Spatial Tangible Interface", In Magazine—Computers in Entertainment, vol. 2, Issue 4, Oct. 1, 2004, pp. 173-180.

"Final Office Action Issued in U.S. Appl. No. 15/231,760", dated Nov. 16, 2018, 20 Pages.

Bolotnyy, et al., "The Practicality of Multi-Tag RFID Systems", In Proceedings of the 1st International Workshop on RFID Technology—Concepts, Applications, Challenges, Jun. 1, 2007, 10 Pages.

Broll, et al., "Mobile and Physical user interfaces for NFC-based mobile interaction with multiple tags", In Proceedings of the 12th International Conference on Human computer interaction with mobile devices and services, 10 Pages.

Hinske Steve, "Determining the Position and Orientation of Multi-Tagged Objects Using RFID Technology", In Proceedings of the Fifth Annual IEEE International Conference on Pervasive Computing and Communications Workshops, Mar. 19, 2007, 5 Pages.

"Office Action Issued in European Patent Application No. 16801628.5", dated Feb. 27, 2019, 11 Pages.

"Office Action Issued in European Patent Application No. 16801897.6", dated Feb. 27, 2019, 7 Pages.

"Non-Final Office Action Issued in U.S Appl. No. 14/931,049", dated Apr. 30, 2019, 30 Pages.

"Non Final Office Action Issued in U.S. Appl. No. 15/231,760", dated Mar. 25, 2019, 21 Pages.

\* cited by examiner

FLEXIBLE MULTI-LAYER SENSING SURFACE

CROSS-REFERENCE TO RELATED APPLICATION

This non-provisional utility application is filed as a continuation-in-part of U.S. application Ser. No. 14/931,049 entitled "Multi-modal Sensing Surface" and filed on Nov. 3, 2015, which is incorporated herein in its entirety by reference.

BACKGROUND

There are a number of different technologies which can be used to provide a touch-sensitive surface and examples include resistive touch-screens, capacitive touch-screens and touch-screens which rely on optical sensing (e.g. using frustrated total internal reflection). Both resistive touch-screens and capacitive touch-screens can be designed to detect the positions of one or more fingers on the surface. Optical multi-touch tables, which use a camera/projector system or sensor-in-pixel technology, have the ability to sense multi-touch user input over a large sensing area. However, such tables are large, have rigid form-factor limitations (because of the optical arrangement) and a high power consumption.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A flexible multi-layer sensing surface comprises a first flexible layer and a second flexible layer. The first flexible layer is a sensing layer and the second sensing layer is another sensing layer or an output layer. The sensing surface also comprises a calibration module which is configured to use the first flexible sensing layer to detect the relative position of the first and second flexible layers and this detected relative position is then used to update one or more stored operating parameters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
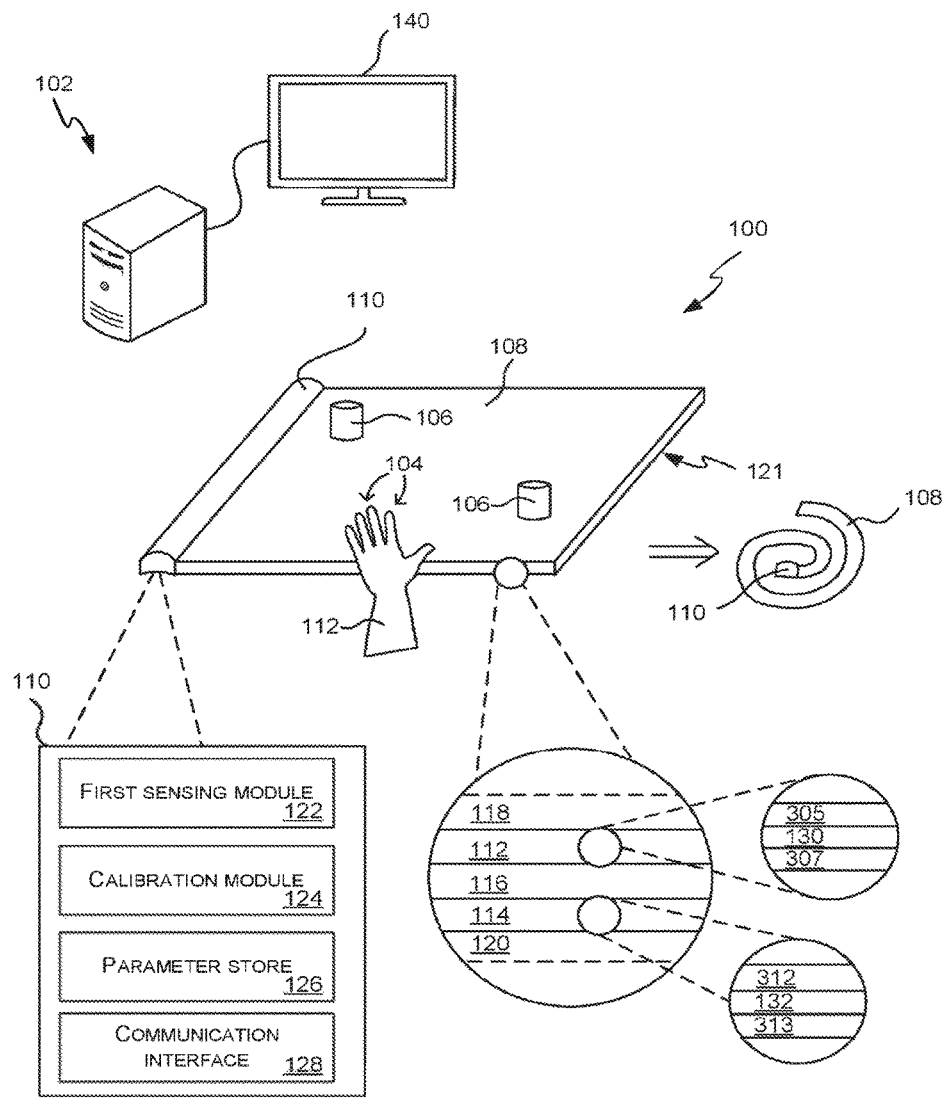
FIG. 1 is a schematic diagram showing a rollable multi-layer sensing surface.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, there are a number of different technologies which can be used to provide a touch-sensitive surface and examples include resistive touch-screens, capacitive touch-screens and touch-screens which rely on optical sensing. There are many applications where having a device with a large interaction/sensing area would be useful, e.g. for collaborative working, where finer-grained input/sensing is useful, where a large number of objects need to be sensed, etc. Furthermore, a large continuous sensing area may enable the sensing area to be sub-divided into different functional areas (e.g. with different areas with different players of a game, or spatially distributed regions that control different software parameters, such as virtual volume sliders for each track in a music mixing application). Larger sensing areas would enable larger sub-divided regions which provides greater ease of use. Existing touch-sensitive surfaces are generally made from rigid materials, however, which makes large touch-sensitive surfaces cumbersome and inefficient to store and transport and may make them more susceptible to damage (e.g. as a consequence of a user dropping them, banging them against other objects or dropping objects onto the surface).

The embodiments described below are not limited to implementations which solve any or all of the disadvantages of known sensing surfaces.

Described herein is a multi-layer sensing surface which comprises a flexible sensing area that can be rolled up for transport or storage and then rolled out (either fully or partially) for use. The multi-layer sensing surface comprises a flexible sensing layer and at least one other flexible layer which is either another flexible sensing layer or a flexible output layer (e.g. a flexible display layer). As described in more detail below, the multi-layer sensing surface may additionally comprise a rigid portion (e.g. comprising electronics) around which the flexible layers can be rolled and there may be additional flexible layers (e.g. additional sensing layers, additional output layers and/or spacer layers between sensing and/or output layers). In various examples there may also be small rigid elements which are attached to the flexible sensing layer or the other flexible layer.

As a consequence of being rolled and unrolled repeatedly by a user, the relative position of the first flexible sensing layer and the second flexible layer (which may be for sensing or output) may change over time. This may be due to material deformation and/or user handling (e.g. the user may not unroll the surface in a repeatable manner). The multi-layer sensing surface described herein further comprises a calibration module (which may be within the rigid portion of the sensing surface) which uses the flexible sensing layer to detect the relative position of the other flexible layer (i.e. a second flexible sensing layer or a flexible output layer). The calibration module then updates one or more stored operating parameters (e.g. calibration parameters) based on the detected relative position and the updated operating parameters are subsequently used when sensing touch events on the multi-layer sensing surface.

FIG. 1 is a schematic diagram showing a rollable multi-layer sensing surface 100 which may operate as a peripheral device (e.g. an input device) for a separate computing device 102 and may communicate with the separate computing device 102 using wired or wireless technologies (e.g. USB, Bluetooth™, Wi-Fi™, etc.). The sensing surface 100 is capable of detecting and locating touch input by a user (e.g. a user's fingers 104) and/or one or more objects 106 on the surface. If any of the objects 106 include a wireless tag (e.g. an NFC or RFID tag), the sensing surface 100 may, in various examples, also be capable of identifying those objects 106 by reading the wireless tag(s).

As shown in FIG. 1, the sensing surface 100 has two parts—a first part 108 (which may be referred to as the sensing mat or pad) which is flexible and a second part 110 (comprising active electronics) which may be flexible or rigid. The first part 108 is a flexible multi-layer structure comprising the flexible sensing layer 112 and at least one other flexible layer 114 which is either another flexible sensing layer or a flexible output layer and as shown in FIG. 1, they may be separated by a layer 116 which may be referred to as a spacer or filler layer and is provided to maintain a separation between the two flexible layers 112, 114 (e.g. where a minimum separation distance is required in operation). There may be additional flexible layers within the multi-layer sensing mat (i.e. within the first part 108) where these additional flexible layers may be additional flexible filler layers, flexible sensing layers and/or flexible output layers and two further optional flexible filler layers 118, 120 are shown in FIG. 1 and provide protection for the upper face of the first flexible layer 112 and the lower face of the second flexible layer 114.

The various layers 112-120 in the first part 108 are joined together where they are attached to the second part 110. In various examples they may be fixed together over the entirety of the first part 108 (e.g. such that the first part appears to be a single layer to a user). In other examples the layers may be fixed together or fixed to a common rigid element at an end which is distal from the second part 110 (e.g. along end 121). In yet further examples, the layers may only be joined together along one edge where they are attached to the second part 110 (e.g. in a similar manner to the pages of a book which are only bound together along one edge). Various examples are described in more detail below.

The second part 110 comprises a first sensing module 122 coupled to the flexible sensing layer 112 and may comprise additional sensing modules in examples where the first part 108 comprises more than one flexible sensing layer (e.g. where the second flexible layer 114 is another flexible sensing layer, the second part 110 may comprise a second sensing module coupled to the second flexible sensing layer). The second part 110 also comprises a calibration module 124 which is arranged to use the first sensing layer to detect the relative position of the other flexible layer and then to update one or more stored operating parameters based on the detected relative position. These operating parameters which are updated by the calibration module 124 and subsequently used by the first sensing module 122 when sensing touch events, are stored in a parameter store 126 within the second part 110 of the sensing surface 100. Depending upon the implementation of the sensing surface 100, the second part may also comprise a communication interface 128 arranged to communicate with the separate computing device 102. In other examples, however, the sensing surface 100 may be integrated with a computing device (e.g. such that the second part 110 additionally comprises the component parts of the computing device such as a processor, memory, display interface, etc.).

The calibration module 124 may be implemented in hardware and/or software and where the calibration module 124 is implemented at least partially in software, the second part 110 may comprise a processor arranged to execute the device-executable instructions which form the calibration module 124 and a memory arranged to store the calibration module 124. Similarly, the first sensing module 112 (and any other sensing modules within the first part 110) may be implemented in hardware and/or software.

Although FIG. 1 shows the first sensing layer 112 above the other flexible layer 114 (which may be a second sensing layer or a flexible output layer), in other examples the layers may be in a different order, e.g. the first sensing layer 112 may be below (i.e. further away from the side on which touch events are detected) the other flexible layer 114. Additionally, the sensing surface 100 may comprise other elements (e.g. other layers, other electronics, etc.) which are not shown in FIG. 1 and described above.

Figure 2:
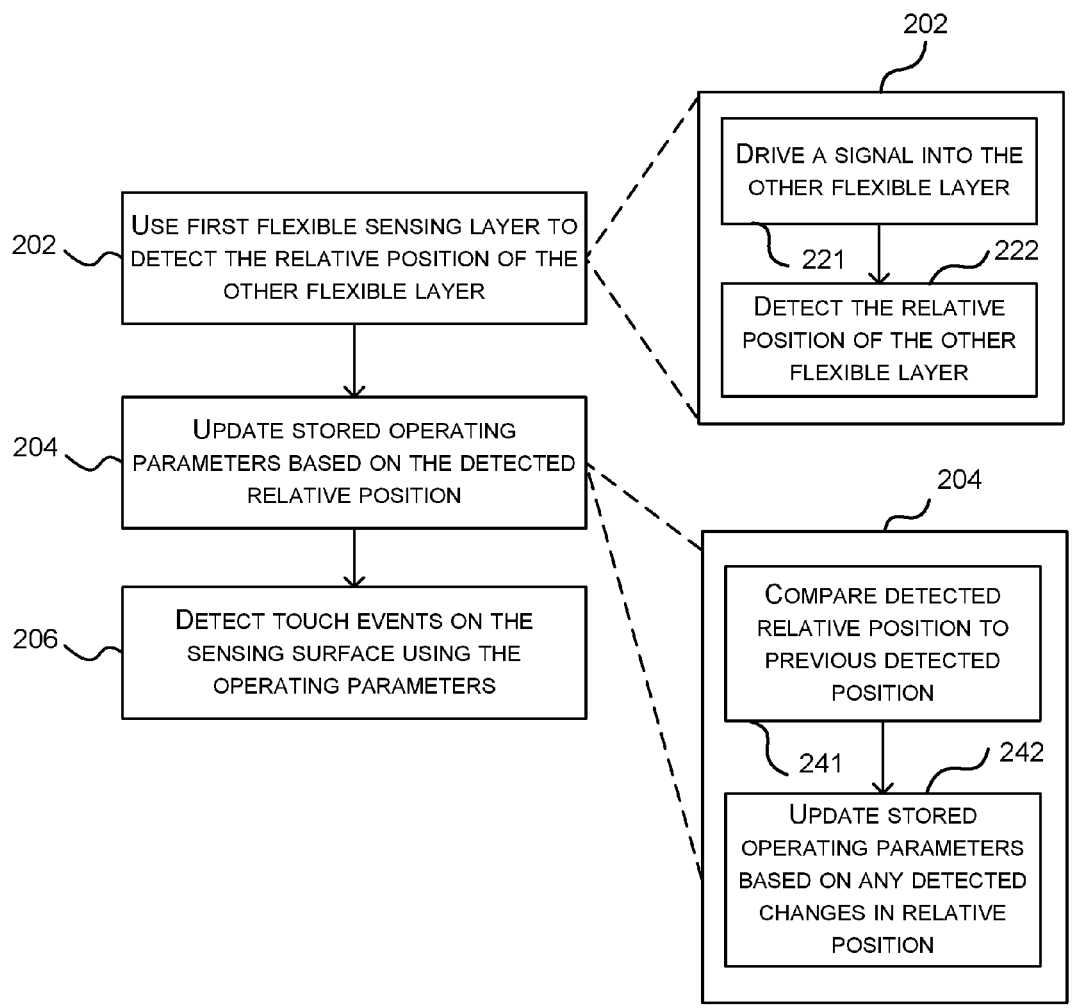
FIG. 2 is a flow diagram showing an example method of operation of a rollable multi-layer sensing surface, such as the sensing surface shown in FIG. 1.

FIG. 2 is a flow diagram showing an example method of operation of a rollable multi-layer sensing surface, such as the sensing surface 100 shown in FIG. 1. At least after each time the sensing mat has been rolled and unrolled (and in some examples more often, e.g. each time the sensing surface is switched on irrespective of whether it has been rolled up or not since its last operation), the sensing surface (e.g. the calibration module 124) uses the first flexible sensing layer 112 to detect a relative position of the other flexible layer 114 (block 202). Based on the detected relative position (from block 202), stored operating parameters are then updated (block 204, e.g. in the calibration module 124) and these operating parameters are used when detecting touch events on the sensing surface (block 206, e.g. by the first sensing module 122).

The operating parameters which are updated (in block 204) and used (in block 206) may, for example, comprise one or more offset parameters (e.g. an x-offset and a y-offset which define offset distances between the first sensing layer 112 and the other flexible layer 114 in two perpendicular directions in the plane of the sensing mat 108, such as a reference point for sensing coordinates of one layer with respect to the pixel position of a display on a second layer or the position of the wires on one layer with respect to sensing elements on a second layer). The offset parameters may, for example, be used so that if touch is detected at a position on the first layer, the corresponding pixel(s) on another layer are illuminated and/or to correlate or synchronize sensing on different layers (e.g. detect an object on one layer, and then energize the correct NFC antennas).

In addition, or instead, the operating parameters which are updated (in block 204) may comprise a parameter which indicates how much of the sensing mat has been unrolled (e.g. fully unrolled, 90% unrolled, etc.) and this may be determined, for example, by detecting the offset between the edges of the two layers 112, 114 at the edges of the layers which are distal from the second part 110 (e.g. at or close to edge 121). In various examples the operating parameters which are updated (in block 204) and used (in block 206) may, for example, identify whether elements of the other flexible layer 114 are operational or broken (e.g. where the other flexible layer 114 comprises an array of antennas/electrodes, the first flexible sensing layer 112 may be used to detect breaks in the wires/tracks forming the antennas/electrodes.

In various examples, the detection of the relative position of the first flexible sensing layer 112 and the other flexible layer 114 (in block 202) may comprise driving a signal into the second flexible layer 114 (block 221, e.g. by or under the control of the calibration module 124) and detecting the relative position of the two flexible layers (block 222, e.g. in the calibration module 124). The signal that is driven into the second flexible layer 114 may depend upon whether the second flexible layer 114 is a second flexible sensing layer or a flexible output layer and may, for example, be a signal that the first flexible sensing layer 112 is sensitive to (e.g. a signal at a frequency that the first flexible sensing layer 112 is sensitive to or a spread-spectrum signal, a carrier wave at a particular frequency, a transient signal, a visible light signal, etc.). In an example where the second flexible layer 114 is a second flexible sensing layer (e.g. an array of RF antennas), the signal may be a high voltage signal. Use of an injected signal whilst detecting the relative position of the two flexible layers may provide improved sensing signal to noise ratio (SNR) compared to passive sensing (i.e. without injecting a signal). Use of an injected signal may assist in disambiguating the sensed features of the other flexible layer from other objects that might be placed on the surface (e.g. a piece of wire) that might provide a false signal to the sensor when using passive sensing.

In various examples, the updating of the stored parameters (in block 204) may comprise comparing the detected relative position to a previously detected relative position (block 241, e.g. in the calibration module 124) and in response to detecting a change in relative position, updating one or more of the stored operating parameters based on the detected change (block 242, e.g. in the calibration module 124). It will be appreciated that in the event that no change in position is detected (in block 241), there will be no update to the stored operating parameters (in block 242).

Figure 3:
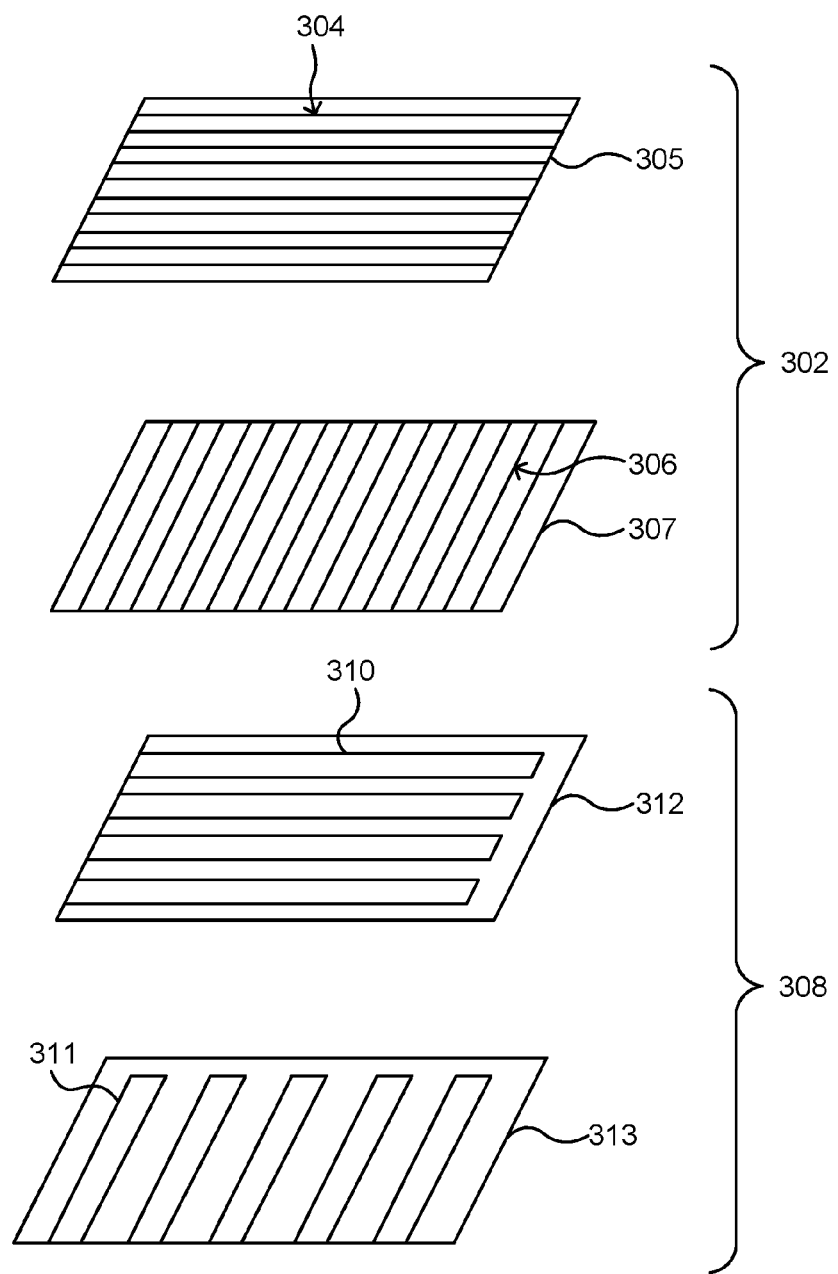
FIG. 3 is a schematic diagram showing an implementation of a part of the sensing surface of FIG. 1 in more detail.

The flexible sensing layer 112 may use any suitable sensing technology and may, for example, comprise a capacitive sensing electrode array 302 as shown in FIG. 3 and described below. The second flexible layer 114 may be a second flexible sensing layer or a flexible output layer. In examples where the second flexible layer is another sensing layer it may, for example, be a layer 308 capable of sensing short-range wireless tags (e.g. NFC or short-range RFID tags) as shown in FIG. 3 and described below. In other examples, the second flexible layer may be a pressure sensing layer, an array of photosensors (e.g. which is capable of detecting an object by occlusion of background light or reflection of light emitted by the surface), a microphone array, an array of temperature sensors, an array of Hall-effect sensors (e.g. which is capable of detecting magnetic elements on top of the surface) or a layer capable of sensing WiFi™ or Bluetooth™ devices. In examples where the second flexible layer is a flexible output layer it may, for example, comprise a plurality of LEDs, a plurality of actuators (e.g. piezo or shape-memory-alloy actuators) that mechanically deform the surface in some way or an OLED display. Various example configurations of flexible sensing surfaces are set out in the table below:

| First flexible sensing layer 112 | Second flexible layer 114 |
| --- | --- |
| Capacitive sensing electrode array | Layer capable of sensing short-range wireless tags |
| Capacitive sensing electrode array | Layer capable of sensing WiFi or Bluetooth devices |
| Capacitive sensing electrode array | Pressure sensing layer |
| Capacitive sensing electrode array | A plurality of LEDs |
| Capacitive sensing electrode array | A flexible OLED display |
| Layer capable of sensing short-range wireless tags | A flexible OLED display with embedded NFC tags or other element that resonates at the frequency sensed by the first flexible sensing layer |

In various examples, the flexible sensing layer 112 may comprise a capacitive sensing electrode array 302 as shown in FIG. 3. The capacitive sensing electrode array 302 comprises a first set of electrodes 304 in a first layer 305 and a second set of electrodes 306 in a second layer 307. In the example shown in FIG. 3 the two sets of electrodes 304, 306 are arranged perpendicular to each other such that one set may be referred to as the x-axis electrodes and the other set may be referred to as the y-axis electrodes. In other examples, however, the sets of electrodes may be arranged such that they are not exactly perpendicular to each other but instead the electrodes cross at a different angle. The sets of electrodes 304, 306 are separated by some insulation which may be in the form of an insulating layer 130 (as shown in FIG. 1) or insulation over the wires that form one or both of the sets of electrodes 304, 306.

In examples where the flexible sensing layer 112 comprises a capacitive sensing electrode array 302, the first sensing module 122 is coupled to the capacitive sensing electrode array 302 and may be configured to detect an increase in capacitance between electrodes or both a decrease and an increase in the capacitance between electrodes in the array. A decrease of mutual capacitance between electrodes (i.e. between one or more electrodes in the first set of electrodes 304 and one or more electrodes in the second set of electrodes 306) is used to detect a user's fingers in the same way as conventional multi-touch sensing. Unlike conventional multi-touch sensing, however, the first sensing module 122 may also be able to detect an increase in the capacitance between electrodes in the array. An increase in mutual capacitance between electrodes (i.e. between one or more electrodes in the first set of electrodes 304 and one or more electrodes in the second set of electrodes 306) is used to detect the position, and in various examples, also the shape, of a conductive object, such as a wireless tag (e.g. an NFC or RFID tag) in a non-conductive housing or other object formed from a conductive material (without a tag). Unlike a user's finger, such an object has no connection to ground and instead it capacitive couples adjacent electrodes (consequently, the object does not need to have a high electrical conductivity and instead can be made from, or include, any conductive material).

In various examples, the flexible sensing layer 112 or the second flexible layer may comprise one or more arrays of RF antennas 308 which are capable of sensing (i.e. activating and reading data from) one or more proximate short-range wireless tags (e.g. NFC or short-range RFID tags), as shown in FIG. 3. The array of RF antennas 308 comprises a plurality of loop antennas and the example in FIG. 3 the array 308 comprises two sets of antennas 310, 311 in two separate layers 312, 313; however, in other examples, the array of RF antennas 308 may comprise only a single set of antennas (i.e. one of the two sets 310, 311 shown in FIG. 3 may be omitted). Two sets of antennas, as shown in FIG. 3 may be provided to enable the sensing surface 100 to distinguish between two objects at different locations but which are both proximate to the same RF antenna (such that if there was only one set of antennas, a single RF antenna would be able to read the tags in both objects). Such a row/column arrangement of RF antennas (comprising two sets of antennas 310, 311 as shown in FIG. 3) also enables the sensing surface to scale better (i.e. to larger sizes of sensing surface) and makes scanning across the area to find an object faster. In an alternative arrangement, a matrix (or grid) of individual antennas (e.g. m by n antennas arranged in a grid) may be used. Such a grid does not scale as well as the arrangement shown in FIG. 3, but may enable addressing of an object at a known location to be performed faster.

In the example shown in FIG. 3 the two sets of antennas 310, 311 are arranged perpendicular to each other in a row/column matrix such that one set may be referred to as the x-axis antennas and the other set may be referred to as the y-axis antennas. In other examples, however, the sets of antennas may be arranged such that they are not exactly perpendicular to each other but instead the antennas cross at a different angle or there may be only a single set of antennas (i.e. one of the sets 310, 311 is omitted). The two sets of antennas 310, 311 are separated by some insulation which may be in the form of an insulating layer 132 (as shown in FIG. 1) or insulation over the wires that form one or both of the sets of antennas 310, 311.

In examples where the flexible sensing layer 112 or the second flexible layer comprises one or more arrays of RF antennas 308 which are capable of sensing (i.e. activating and reading data from) one or more proximate short-range wireless tags (e.g. NFC or short-range RFID tags), the sensing module (which may be the first sensing module 122 or a second sensing module not shown in FIG. 1) is coupled to the array of RF antennas and is configured to selectively tune and detune the RF antennas in the array, where, when tuned, these antennas are tuned to the same frequency as the wireless tags in the objects (e.g. 13.56 MHz for NFC) such that the second sensing module can activate a proximate wireless tag and receive data from the tag (e.g. a unique ID of the tag). The location and identity information (where known) may then be provided as an input to software running on a computing device (e.g. computing device 102).

Figure 9:
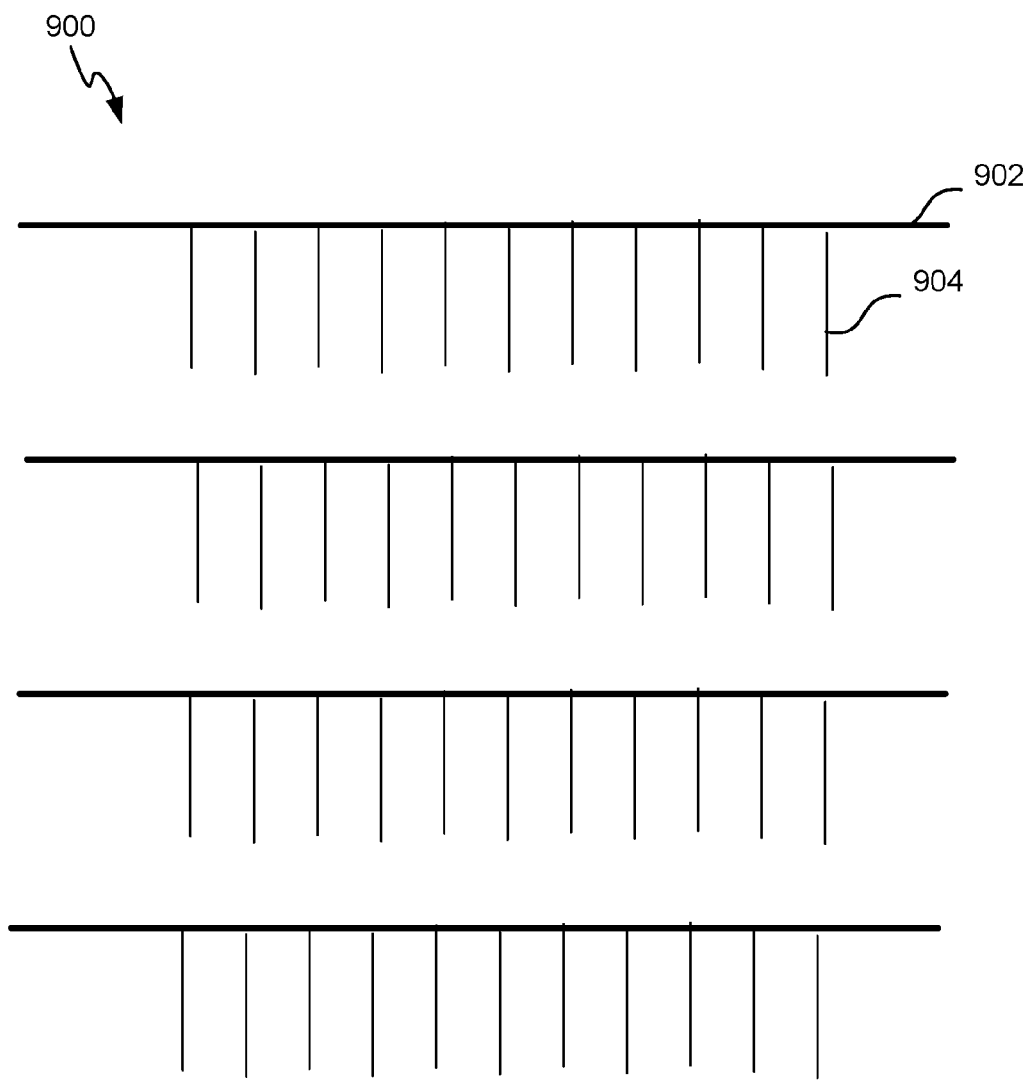
FIG. 9 is a schematic diagram showing an example implementation of a part of the sensing surface of FIG. 1 in more detail.

In examples where the flexible sensing layer 112 or the second flexible layer is capable of sensing WiFi or Bluetooth devices, the layer may comprise an array of single loop, long antennas (e.g. similar to the array of RF antennas described above). In another example, the layer may comprise a 'leaky-feeder' style antenna, i.e. an imperfectly shielded transmission line, designed to radiate along its length. A further example is shown in FIG. 9 in which each row/column comprises a single 50Ω feeder line 902 with multiple small antennas 904 connected to it, each one tuned to 2.4 GHz. FIG. 9 shows a single array (comprising a plurality of rows) and in various examples the layer may comprise two arrays having the feeder lines 902 at different orientations, e.g. perpendicular to one another (e.g. similar to the plurality of RF antennas 308 shown in FIG. 3). Although not shown in FIG. 9, the layer 900 may include tuning components (e.g. a capacitor) at the interface between the feeder line 902 and each of the antennas 904.

The functionality of the first sensing modules 122 and any other sensing modules within the sensing surface may be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In examples where the second part 110 comprises a processor (e.g. because sensing surface 100 is integrated with a computing device and/or because the first sensing module 112 and/or the calibration module 124 is implemented in software), the processor may be a microprocessor, controller or any other suitable type of processor for processing computer executable instructions to control the operation of the device in order to implement relevant functionality (e.g. the functionality of the computing device, sensing module and/or calibration module).

The instructions executed by the processor (e.g. an operating system and application software and/or device-executable instructions which form the sensing module and/or calibration module to the extent that either is implemented in software rather than hardware) may be provided using any computer-readable media that is accessible by the sensing surface 100. Computer-readable media may include, for example, computer storage media such as memory (which may additionally comprise the parameter store 126) and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage media (e.g. the memory which comprises the parameter store 126) is shown within the sensing surface 100 it will be appreciated that the storage may be distributed or located remotely and accessed via a network or other communication link (e.g. using the communication interface 128).

The sensing surface 100 may also comprise an input/output interface (not shown in FIG. 1) which is arranged to output display information to a display device 140 which may be separate from or integral to the sensing surface 100. The display information may provide a graphical user interface. The input/output interface may also be arranged to receive and process input from one or more devices, such as a user input device (e.g. a mouse, keyboard, camera, microphone or other sensor). In some examples the user input device may detect voice input, user gestures or other user actions and may provide a natural user interface (NUI). The sensing surface may also provide a NUI. NUI technology enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The layers 112-120 within the flexible sensing mat 108 are described above as being flexible. In various examples, some or all of these layers are both flexible and stretchable/compressable and various example implementations are described below.

A first example implementation can be described with reference to FIG. 1. In this example, either the first flexible layer 112 (i.e. the sensing layer) or the second flexible layer 114 (i.e. the sensing/output layer) is formed from/on a material which is flexible but is not able to stretch. For example, the layer may be fabricated using conductive ink (e.g. silver ink) printed on a sheet of polyethylene terephthalate (PET) or a polyimide film (e.g. Kapton™ film). Any layers which are above the flexible but non-stretchable layer (i.e. those layers which are closer to the center of the rolled up surface) are formed from materials which are both flexible and compressable and any layers which are below the flexible but non-stretchable layer (i.e. those layers which are further from the center of the rolled up surface) are formed from materials which are both flexible and stretchable.

Figure 4:
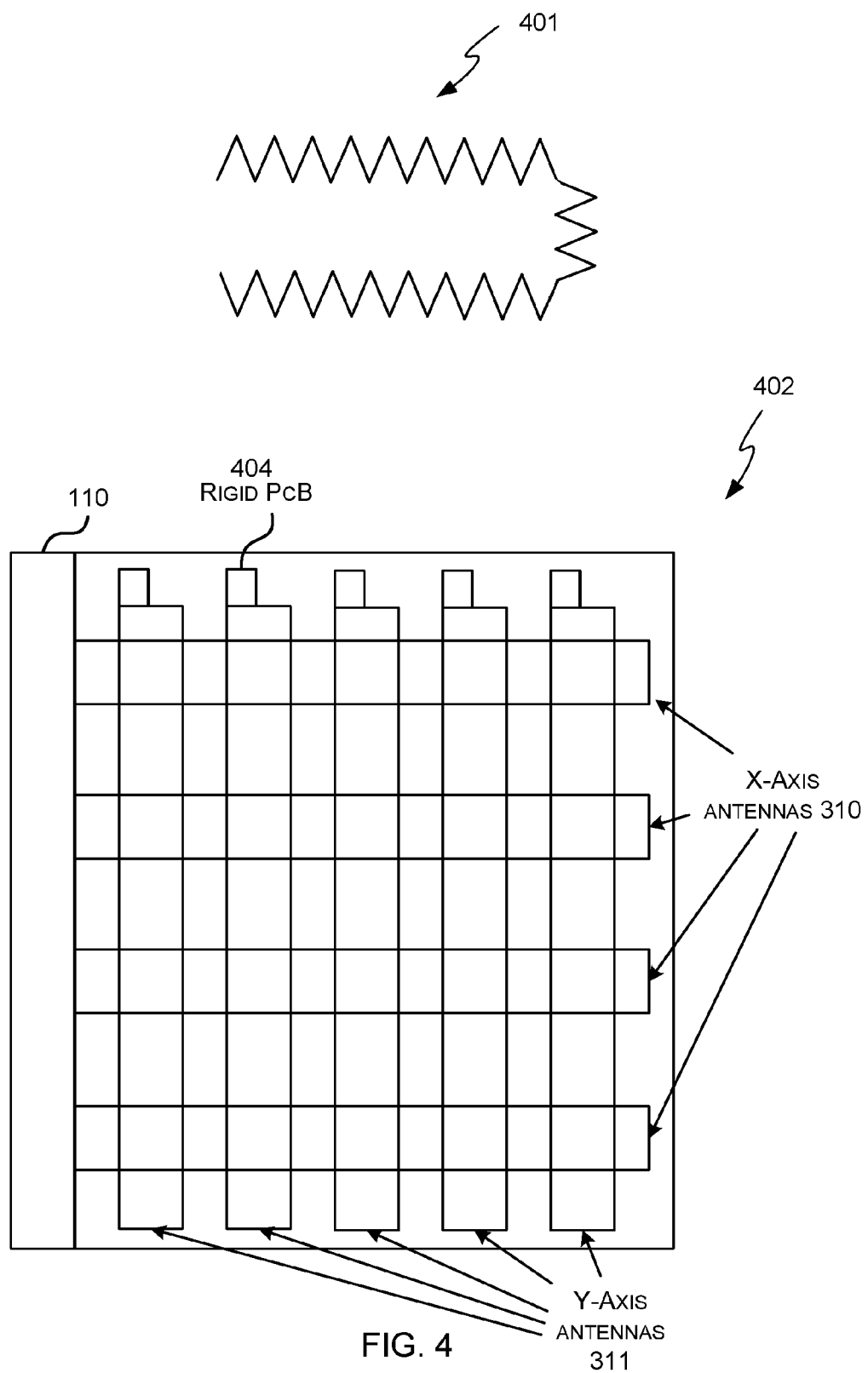
FIG. 4 is a schematic diagram showing an example implementation of one or more RF loop antennas in the sensing surface of FIG. 1.

For example, if the first flexible sensing layer 112 is formed from a material which is flexible but is not able to stretch (e.g. silver ink on PET), the second flexible layer 114 is formed from a material which is both flexible and stretchable, e.g. from an elastic piece of fabric with conductors formed in copper wire and sewn into the fabric. As the copper wire is itself not stretchable, the conductors may be formed in a zigzag shape 401 as shown in FIG. 4. The example shown in FIG. 4 is a single RF loop antenna (e.g. as described above with reference to FIG. 3). The zigzags in the wire allow the wires to stretch out and align as the fabric stretches. Where the second flexible layer 114 comprises one or more arrays of RF antennas (e.g. as shown in FIG. 3), the zigzag shape 401 shown in FIG. 4 may be repeated to provide an array of RF antennas on a single piece of elastic fabric and where there are two arrays of RF antennas 310, 311, there may be two pieces of elastic fabric (i.e. two separate layers 312, 313) each comprising an array of RF antennas having the structure 401 shown in FIG. 4.

In examples where the second flexible layer 114 comprises a first array of RF antennas 310 formed in a first flexible layer 312 and a second array of RF antennas 311 formed in a second flexible layer 313, the second flexible layer 313 may have small PCBs 404 mounted on it at the end of each of the y-axis antennas, as shown in the second diagram 402 in FIG. 4. These PCBs 404 may be formed on a flexible or rigid substrate and enable tuning of the y-axis antennas 311. Although this second diagram 404 shows both arrays of RF antennas 310, 311, it will be appreciated that they may be formed in separate layers of material (e.g. as shown in FIG. 1).

Figure 5:
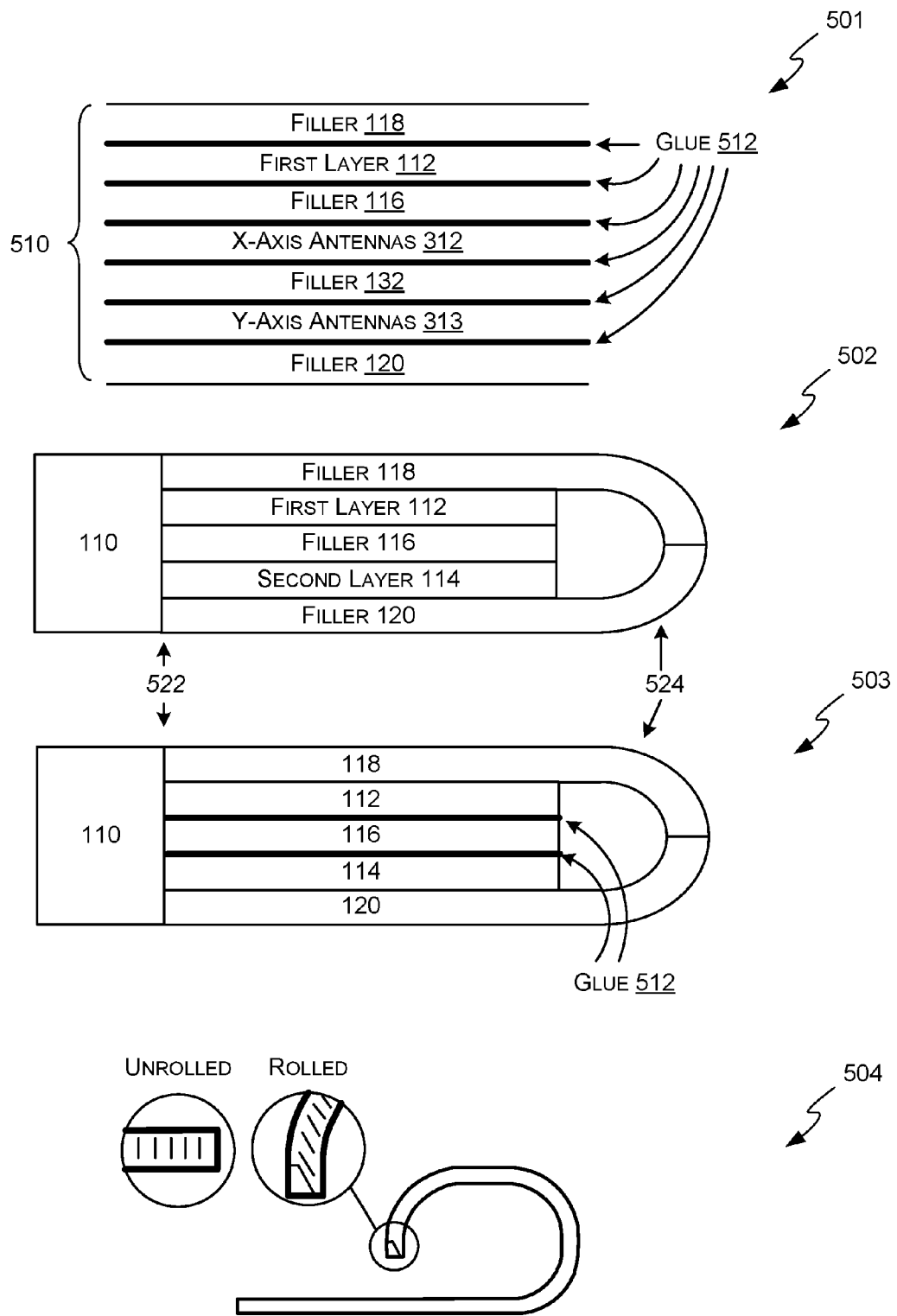
FIG. 5 shows schematic diagrams of various example implementations of the sensing surface of FIG. 1.

In this first example implementation, the filler layers 116, 118, 120, 130, 132 may be formed from a material which can be flexed, stretched and compressed and the entire stack of layers (which form the sensing mat 108) may then be combined into a single composite layer 510 as shown in the first example 501 in FIG. 5, e.g. using heat activated glue layers and a hot press. By combining all the layers today, this results in a composite layer 510 without air bubbles between layers and which provides a fixed separation between the flexible layers 112, 114 (which may improve the reliability of the sensing).

A second example implementation can be described with reference to the second diagram 502 in FIG. 5. In this example, the flexible layers 112, 114 and a filler layer 116 between them are not joined together except for along the edge where they join the second part 110 of the sensing surface 100. In order to allow the layers to slide past each other (e.g. when the sensing mat 108 is rolled and unrolled) but not to separate, the layers 112-116 are contained within two fully flexible and stretchable layers 118, 120 which are joined along at least two edges (e.g. they may be joined along the edge 522 where they join the second part 110 and along an edge 524 which is distal from the second part 110 or they may be joined along the edge 522 where they join the second part 110 and along the two adjacent edges but not along the edge 524 which is distal from the second part 110).

A third example implementation combines aspects of the first and second example implementations described above and can be described with reference to the third diagram 503 in FIG. 5. In examples where the first and second flexible layers 112, 114 are both sensing layers (e.g. where the first sensing layer 112 is a capacitive sensing electrode array 302 and the second flexible layer 114 is comprises one or more arrays of RF antennas 310, 311), the operation of the sensing surface 100 may be affected by changes in the separation of these two sensing layers. In such an example, the filler layer 116 between the sensing layers may be formed from a highly elastic layer (e.g. a layer made from silicone gel, which can be stretched easily but will resist deformation and try to spring back to its original shape) which is glued (by glue layers 512) to both sensing layers 112, 114. However, the sensing layers 112, 114 are not attached to the two fully flexible and stretchable layers 118, 120, except at the edge 522 where they join the second part 110. As in the second example described above, the two fully flexible and stretchable layers 118, 120 which are joined along at least two edges (e.g. they may be joined along the edge 522 where they join the second part 110 and along an edge 524 which is distal from the second part 110 or they may be joined along the edge 522 where they join the second part 110 and along the two adjacent edges but not along the edge 524 which is distal from the second part 110).

If, in the third example implementation, the two fully flexible and stretchable layers 118, 120 are joined along the edge 522 where they join the second part 110 and along the two adjacent edges but not along the edge 524 which is distal from the second part 110, this enables the two sensing layers 112, 114 to slip past each other (as the filler layer 116 deforms) whilst maintaining a constant spacing between the two sensing layers 112, 114 as shown in the fourth diagram 504 in FIG. 5.

Figure 6:
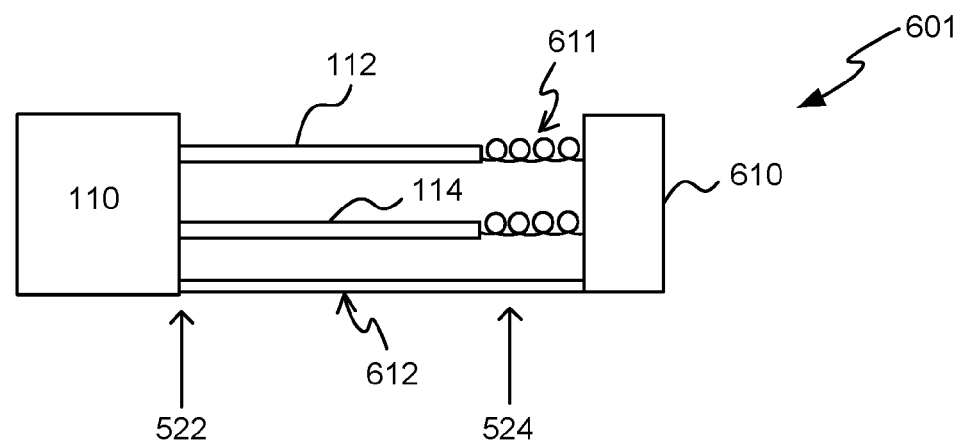
FIG. 6 shows schematic diagrams of another example implementation of the sensing surface of FIG. 1.
Figure 6:
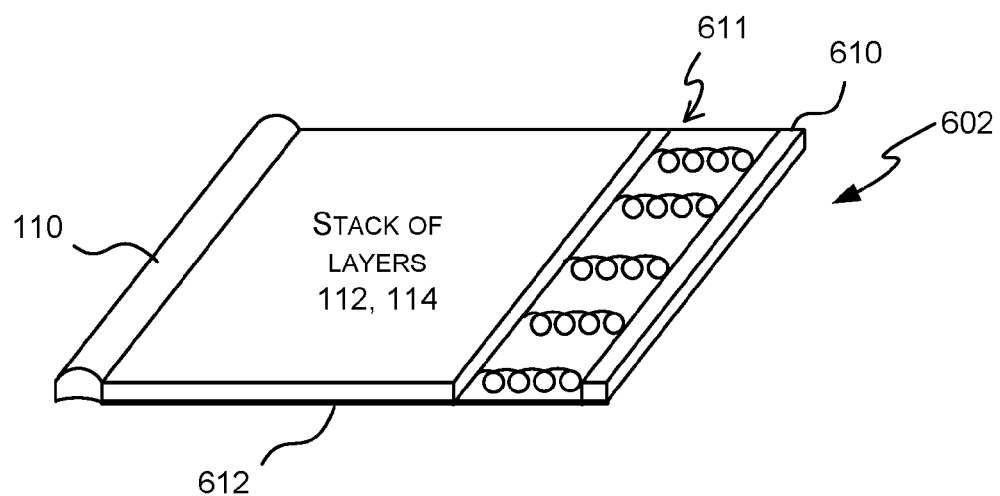

A fourth example implementation can be described with reference to FIG. 6 which shows both a cross-section view 601 and a perspective view 602. In this example, the first and second flexible layers 112, 114 are attached at one edge to the second part 110 of the sensing surface 100 and are attached at the opposite edge 524 (i.e. along the edge 524 which is distal from the second part 110) to a rigid frame element 610 by means of elastic elements 611 which may be a piece of elastic material, springs, etc. If a flexible layer is formed from an elastic material, the entire layer may act as the elastic element and there is no separate elastic element between the layer and the rigid frame. The rigid frame element 610 is attached to a bistable spring 612 which may be made of flexible stainless steel. The bistable spring 612 has two stable states: flat (as shown in FIG. 6) and rolled up. This has the effect that the sensing surface 100 has two stable states: fully unrolled and fully rolled and in the fully unrolled state, the combination of the rigid frame element, the bistable spring 612 and the elastic elements 611 ensures that each of the flexible layers is held taught and parallel to each other at a fixed spacing. This avoids problems in sensing which may otherwise arise if the flexible layers are separated by a variable distance across their area or if one of the layers is buckled.

Although FIG. 6 shows only the two flexible layers 112, 114 and no filler layers, it will be appreciated that there may be filler layers within the stack of layers (e.g. as in other example implementations) and these may be bonded to one or both of the flexible layers (e.g. as described above with reference to the third example implementation) or not (e.g. as described above with reference to the second example implementation).

The example implementations are described above as using glue to bond layers together. It will be appreciated that in other examples different techniques to attach layers together may be used. For example, layers may be stitched together (using an elastic thread).

It will be appreciated that any aspects of any of the implementations described above may be combined with aspects of others of the implementations described above to produce further example implementations.

Figure 7:
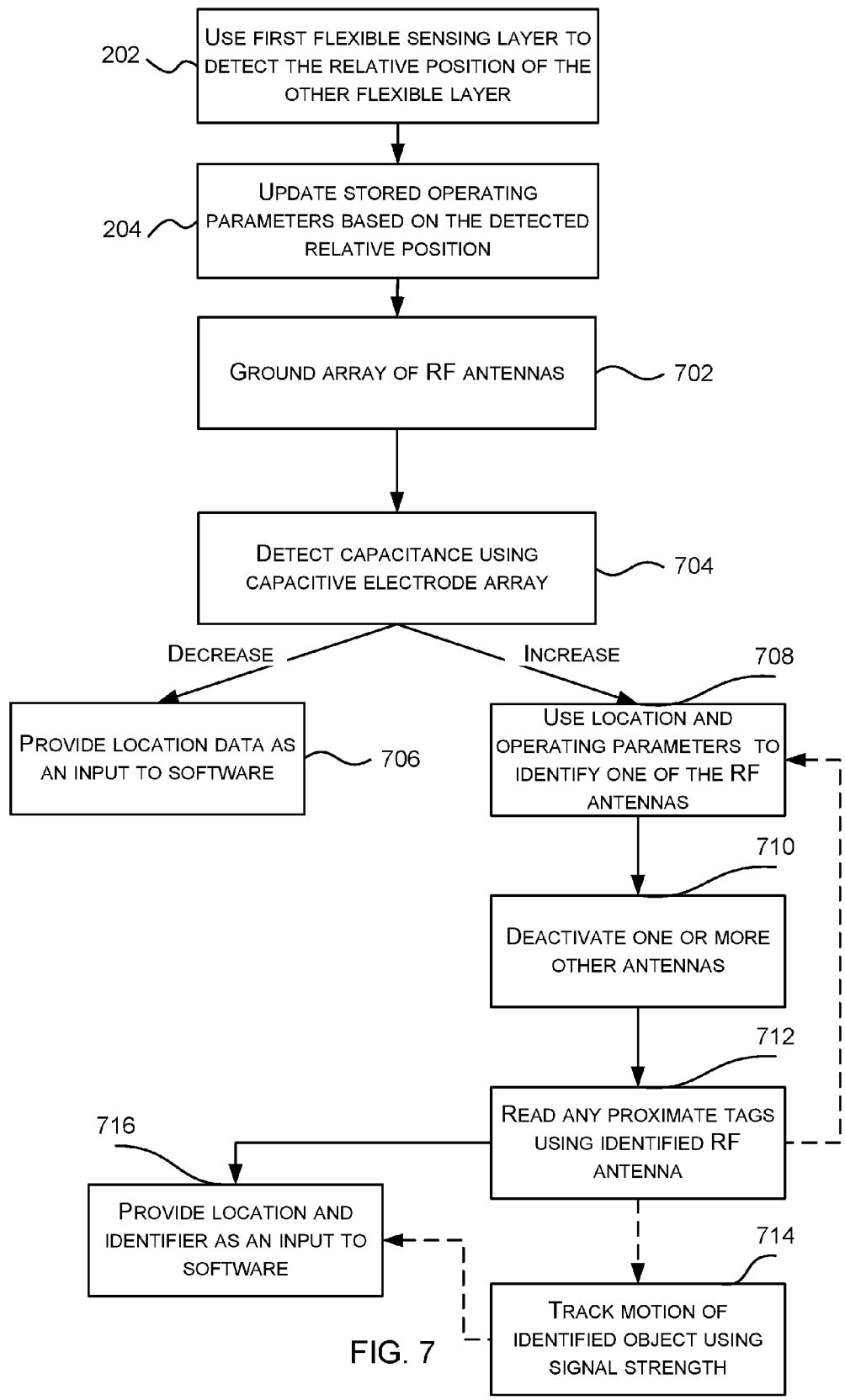
FIG. 7 is a flow diagram showing another example method of operation of a rollable multi-layer sensing surface, such as the sensing surface shown in FIG. 1.

FIG. 7 is a flow diagram showing another example method of operation of a rollable multi-layer sensing surface comprising a first flexible sensing surface 112 which comprises a capacitive sensing electrode array 302 and a second flexible sensing surface 114 which comprises one or more arrays of RF antennas 308. At least after each time the sensing mat has been rolled and unrolled (and in some examples more often), the sensing surface (e.g. the calibration module 124) uses the first flexible sensing layer 112 to detect a relative position of the second flexible sensing layer 114 (block 202). Based on the detected relative position (from block 202), stored operating parameters are then updated (block 204, e.g. in the calibration module 124). The operating parameters which are updated (in block 204) may, for example, comprise one or more offset parameters (e.g. an x-offset and a y-offset which define offset distances between the first flexible sensing layer 112 and the second flexible sensing layer 114 in two perpendicular directions in the plane of the sensing mat 108). In addition, or instead, the operating parameters which are updated (in block 204) may comprise a parameter which indicates how much of the sensing mat 108 has been unrolled (e.g. fully unrolled, 90% unrolled, etc.).

Whilst all the RF antennas (in array 308) are grounded (block 702, e.g. by a second sensing module in the second part 110 of the sensing surface), the sensing surface 100 can detect changes in capacitance using the capacitive electrode array 302 (block 704, by the first sensing module 122). If the first sensing module detects a decrease in capacitance at a location on the sensing surface (in block 704), this location is provided as an input to software (block 706, e.g. where the software may be running on a processor in the sensing surface 100 or in a separate computing device 102).

If the first sensing module 122 detects an increase in capacitance at a location on the sensing surface (in block 704), the location and the operating parameters are used to identify one of the RF antennas (block 708, e.g. by the second sensing module) and then all other RF antennas are deactivated (block 710, e.g. by the second sensing module). The operating parameters which are used (in block 708) define any offset between the original relative position of the capacitive sensing electrode array 302 and the array of RF antennas 308 which, as described above, may be caused by the repeated rolling and unrolling of the sensing surface. The identified RF antenna (which has not been deactivated in block 710) is then used to read any proximate wireless tags (block 712, by the second sensing module 604). By using the operating parameters in this way, any change in relative position of the two sensing layers is calibrated out and an incorrect RF antenna is not identified and used (in blocks 708-712).

The reading of a proximate wireless tag (in block 712) comprises activating the tag and then reading data transmitted by the activated tag. The tag is activated by the RF power coupled to it from the antenna and if the tag is a passive tag, this coupled RF power also provides sufficient power to enable the tag to transmit the data (which comprises an ID for the tag). In various examples, the power which is coupled from the RF antenna to the tag may also power other functionality within the object, such as a flashing LED within the object.

In some examples, the location which is identified (in block 704, by the first sensing module 122) may be between two RF antennas in the same set (e.g. set 310 or set 311 in FIG. 3) and/or correspond one RF antenna in each set of antennas 310, 311. In such examples, blocks 708-712 may be repeated for each RF antenna that corresponds to the location. Where blocks 708-712 are repeated for two RF antennas in the same set, the relative signal strengths of the data received from the wireless tag(s) may be used to provide further location information between the object (e.g. by interpolating between the positions of the two RF antennas, which may be used to disambiguate between a user touch or a generic conductive object and an intentionally wireless-tagged object) and/or to distinguish between multiple tags (where multiple tags can be read by either or both of the two RF antennas). Where blocks 708-712 are repeated for two RF antennas in different sets (i.e. one from each set), this may be used to correctly identify objects where there is more than one object on the sensing surface such that either or both of the RF antennas can read multiple wireless tags (e.g. with the correct tag for the location being the one that is read by both the antennas).

Having located and identified an object with a wireless tag on the sensing surface using the method described above, the method (i.e. blocks 702-712) may be repeated to track any movement of the identified object. Alternatively, the tracking of an object may be performed based on signal strength (block 714, i.e. based on the strength of the signal received from the wireless tag) without reading (i.e. decoding) the data transmitted by the tag repeatedly and this may be less susceptible to noise than only using the capacitive sensing to track location (in block 704) because the capacitive sensing may detect both the object (which results in an increase in capacitance between electrodes in the array 302) and a user's hand holding and moving the object (which results in a decrease in capacitance between electrodes in the array 302). Furthermore, by detecting whether an object is being touched or picked up by a user or not, this may be provided as additional input data to software (in block 716).

The location data and object identifier (as read from the wireless tag) which are determined (in blocks 704 and 708-712) are then provided as an input to software (block 716, e.g. where the software may be running on a processor in the sensing surface 100 or in a separate computing device 102). If the object which caused the increase in capacitance (as detected in block 704) does not include a wireless tag, no object ID will be read by the second sensing module (in block 712) in which case, only location information will be provided as an input to software (in block 716).

If a change in capacitance is detected at more than one location (in block 704) the subsequent blocks in the method of FIG. 7 may be repeated and depending upon the particular situation, the subsequent blocks may be implemented serially or in parallel for each of the locations. For example, if there is one or more location where a decrease in capacitance is detected (in addition to none, one or more location where an increase in capacitance is detected), then all these locations where a decrease was detected may be provided in parallel as an input to software (in block 706).

In examples where the operating parameters (which are updated in block 204) include one or parameters which identify the extent to which the sensing mat 108 has been unrolled, there may be an additional filtering operation that may prevent the use of the location information which is generated using the capacitive sensing electrode array (in block 704). If the operating parameters indicate that the detected change in capacitance (as detected in block 204) is in a location which corresponds to a part of the sensing mat 108 which is still rolled up, then that change in capacitance is ignored and does not trigger the provision of the location as an input to software (in block 706) or the identification of an RF antenna (in block 708). This prevents incorrect locations being used as a result of the mat not being fully unrolled.

As described above, the one or more operating parameters which indicate how much of the sensing mat has been unrolled (e.g. fully unrolled, 90% unrolled, etc.) may be determined by detecting the offset between the edges of the two layers 112, 114 at the edges of the layers which are distal from the second part 110 (e.g. at or close to edge 121, 524). In other examples, however, the operating parameters which indicate how much of the sensing mat has been unrolled may be determined using the first flexible sensing layer 112 where this comprises a capacitive sensing electrode array 302. The parts of the sensing mat may be determined by comparing a current set of capacitive measurements across the entire array 302 to a stored set of capacitive measurements which were previously made when the sensing mat was in a known state (e.g. fully unrolled).

Figure 8:
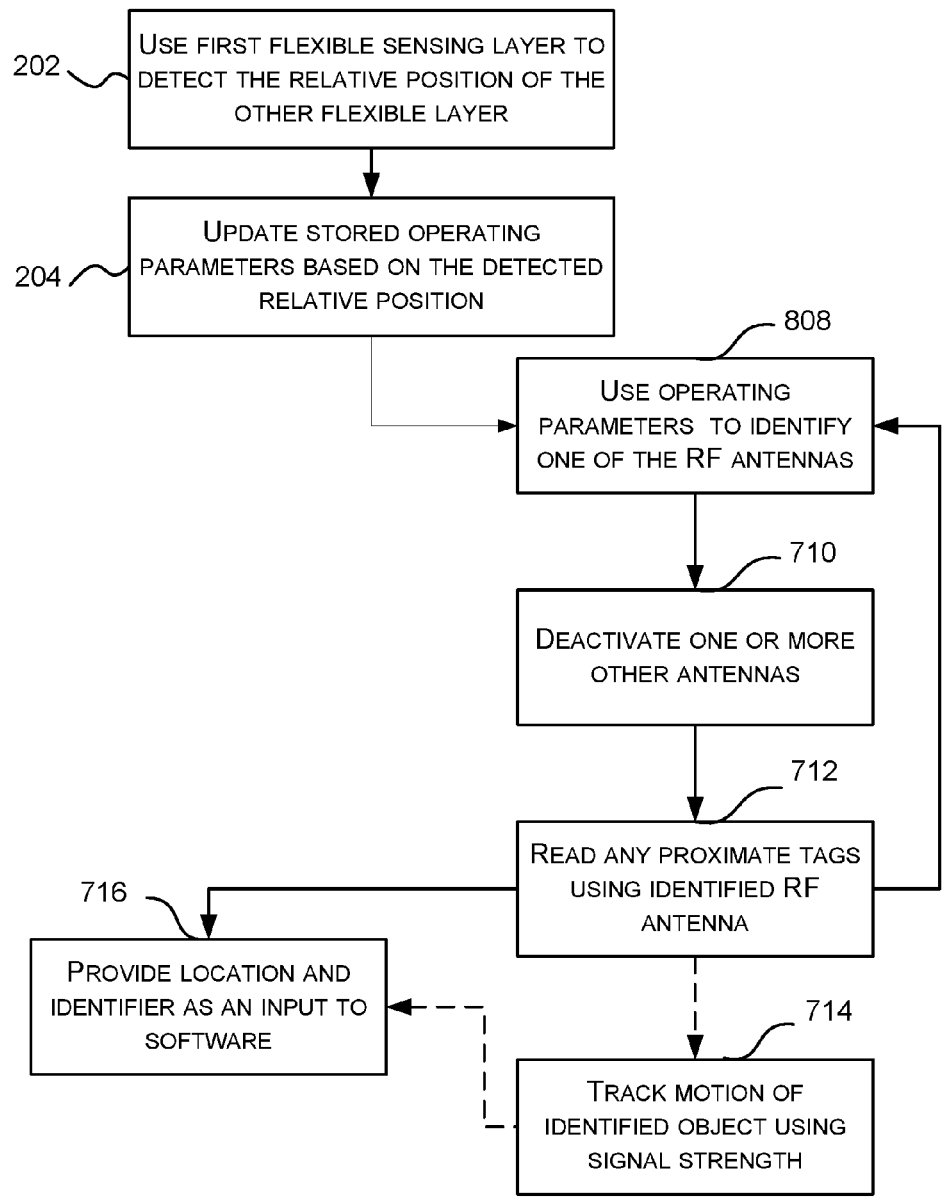
FIG. 8 is a flow diagram showing a further example method of operation of a rollable multi-layer sensing surface, such as the sensing surface shown in FIG. 1.

FIG. 8 is a flow diagram showing a further example method of operation of a rollable multi-layer sensing surface comprising a first flexible sensing surface 112 which comprises a capacitive sensing electrode array 302 and a second flexible sensing surface 114 which comprises one or more arrays of RF antennas 308. Like the example shown in FIG. 7 and described above, the method starts by using the first flexible sensing layer 112 to detect a relative position of the second flexible sensing layer 114 (block 202). Based on the detected relative position (from block 202), stored operating parameters are then updated (block 204, e.g. in the calibration module 124). The operating parameters which are updated (in block 204) may, for example, comprise a parameter which indicates how much of the sensing mat 108 has been unrolled (e.g. fully unrolled, 90% unrolled, etc.). This parameter, which indicates how much of the sensing mat 108 has been unrolled, is then used when determining how to scan through the RF antennas to read any proximate short-range wireless tags (blocks 808, 710, 712). In particular, the parameter is used to exclude none, one or more of the RF antennas in the array from being selected (in block 808) and subsequently used (in block 712). This speeds up the process of scanning through all of the RF antennas and avoids obtaining spurious readings which might otherwise be obtained when activating an RF antenna which is in a part of the sensing mat that is still rolled up.

As shown in FIG. 8, the operating parameters are used to identify one of the RF antennas (block 808, e.g. by a second sensing module in the second part 110 of the sensing surface 100) and then all other RF antennas are deactivated (block 710, e.g. by the second sensing module). The identified RF antenna (which has not been deactivated in block 710) is then used to read any proximate wireless tags (block 712, by the second sensing module 604). The reading of a proximate wireless tag (in block 712) comprises activating the tag and then reading data transmitted by the activated tag. The tag is activated by the RF power coupled to it from the antenna and if the tag is a passive tag, this coupled RF power also provides sufficient power to enable the tag to transmit the data (which comprises an ID for the tag). In various examples, the power which is coupled from the RF antenna to the tag may also power other functionality within the object, such as a flashing LED within the object.

The method (blocks 808, 710, 712) is then repeated for each RF antenna in the array except for those excluded as a consequence of the value of the operating parameter (as described above).

Having located and identified an object with a wireless tag on the sensing surface using the method described above, the method may be repeated to track any movement of the identified object. Alternatively, the tracking of an object may be performed based on signal strength (block 714, i.e. based on the strength of the signal received from the wireless tag) without reading (i.e. decoding) the data transmitted by the tag repeatedly.

The location data and object identifier (as read from the wireless tag) which are determined (in blocks 808, 710, 712) are then provided as an input to software (block 716, e.g. where the software may be running on a processor in the sensing surface 100 or in a separate computing device 102).

Although the present examples are described and illustrated herein as being implemented in a sensing surface as shown in FIG. 1, the system described is provided as an example and not a limitation. As those skilled in the art will appreciate, the present examples are suitable for application in a variety of different types of sensing surfaces and computing systems. Although the sensing mat 108 is shown as being square or rectangular it may be of any shape and any size. Whilst it is shown in a horizontal orientation in FIG. 1, this is by way of example only and may be used in any orientation. It may also have many more layers than are described above.

There are many applications for the sensing surface described herein. In various examples the sensing surface may be integrated within a computing device or a peripheral device (e.g. a flexible keyboard). In other examples, the sensing surface may be a peripheral device for a separate computing device 102 (e.g. as shown in FIG. 1). In various examples, the sensing surface described herein may be part of a wearable computing device or may be integrated into a piece of clothing or jewelry to provide a wearable peripheral device (which may communicate with a separate computing device 102 which may be another wearable device or a non-wearable device such as a smartphone or tablet computer).

A first further example provides a flexible multi-layer sensing surface comprising: a first flexible sensing layer; a second flexible layer comprising a second flexible sensing layer or a flexible output layer; and a calibration module arranged to use the first flexible sensing layer to detect a relative position of the first flexible sensing layer and the second flexible layer and to update one or more stored operating parameters based, at least in part, on the detected relative position.

The calibration module may be arranged to drive a signal into the second flexible layer while detecting the relative position of the first flexible sensing layer and the second flexible layer.

Alternatively or in addition to any of the preceding examples the first flexible sensing layer may comprise a capacitive sensing electrode array.

Alternatively or in addition to any of the preceding examples the second flexible layer may comprise an array of RF antennas.

Alternatively or in addition to any of the preceding examples the one or more stored parameters may comprise at least one offset parameter specifying a change in relative position of the first flexible sensing layer and the second flexible layer.

Alternatively or in addition to any of the preceding examples the one or more stored parameters may comprise a parameter indicating whether the sensing surface is fully or partially unrolled.

Alternatively or in addition to any of the preceding examples the second flexible layer may be both flexible and stretchable.

Alternatively or in addition to any of the preceding examples the flexible multi-layer sensing surface may further comprise a filler layer between the first flexible sensing layer and second flexible layer. The first flexible sensing layer, filler layer and second flexible layer may be bonded together to form a single composite layer.

Alternatively or in addition to any of the preceding examples the flexible multi-layer sensing surface may further comprise: an upper filler layer and a lower filler layer formed from an elastic material, and wherein the single composite layer is positioned between the upper filler layer and the lower filler layer, all the layers are joined together along only one edge and the upper filler layer and the lower filler layer are joined together along at least one other edge.

Alternatively or in addition to any of the preceding examples the flexible multi-layer sensing surface may further comprise: an upper filler layer and a lower filler layer formed from an elastic material, and wherein the first flexible sensing layer, filler layer and second flexible layer are positioned between the upper filler layer and the lower filler layer, all the layers are joined together along only one edge and the upper filler layer and the lower filler layer are joined together along at least one other edge.

Alternatively or in addition to any of the preceding examples the flexible multi-layer sensing surface may further comprise a flexible sensing mat and a rigid portion, wherein the flexible sensing mat comprises the first flexible sensing layer and the second flexible layer and the rigid portion comprises the calibration module.

A second further aspect provides a method of operation of a flexible multi-layer sensing surface comprising: using a first flexible sensing layer in the flexible multi-layer sensing surface to detect a relative position of a second flexible layer in the multi-layer sensing surface; accessing and updating one or more stored operating parameters based on the detected relative position; and detecting a position of a touch event on the sensing surface using the updated operating parameters.

Using a first flexible sensing layer in the flexible multi-layer sensing surface to detect a relative position of a second flexible layer in the multi-layer sensing surface may comprise: injecting a signal into the flexible second layer; and detecting the relative position of the first flexible layer and the second flexible layer using the first flexible sensing layer.

Alternatively or in addition to any of the preceding examples accessing and updating one or more stored operating parameters based on the detected relative position may comprise: comparing the detected relative position to a previously relative position; and accessing and updating one or more stored operating parameters based on any changes in the relative position of the first flexible layer and the second flexible layer.

Alternatively or in addition to any of the preceding examples the first flexible sensing layer may comprise a capacitive sensing electrode array.

Alternatively or in addition to any of the preceding examples the second flexible layer may comprise an array of RF antennas.

Alternatively or in addition to any of the preceding examples the first flexible sensing layer may comprise a capacitive sensing electrode array and the second flexible layer comprises an array of RF antennas and detecting a position of a touch event on the sensing surface using the updated operating parameters may comprise: using the updated operating parameters to identify one of the RF antennas from the array; deactivating one or more other RF antennas from the array; and reading any proximate short-range wireless tags using the identified RF antenna.

Alternatively or in addition to any of the preceding examples the method may further comprise: providing an identifier read from a proximate short-range tag and position data for the tag as an input to software.

Alternatively or in addition to any of the preceding examples the method may further comprise, prior to identifying one of the RF antennas: connecting the array of RF antennas to ground; and detecting an area of increased capacitance between electrodes in the capacitive sensing electrode array, and wherein using the updated operating parameters to identify one of the RF antennas from the array comprises: using a location of the area of increased capacitance and the updated operating parameters to identify one of the RF antennas from the array.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A flexible multi-layer sensing surface comprising:
a first flexible sensing layer;
a second flexible layer comprising a second flexible sensing layer or a flexible output layer, wherein the first flexible sensing layer and the second flexible layer comprise a first part; and
a calibration module in a second part arranged to use the first flexible sensing layer to detect a relative position of the first flexible sensing layer and the second flexible layer and to update one or more stored operating parameters based, at least in part, on the detected relative position, wherein the one or more stored operating parameters comprises at least one offset parameter specifying a change in the relative position of the first flexible sensing layer and the second flexible layer in two perpendicular directions in a plane of the flexible multi-layer sensing surface.

2. The flexible multi-layer sensing surface according to claim 1, wherein the calibration module is arranged to drive a signal into the second flexible layer while detecting the relative position of the first flexible sensing layer and the second flexible layer.

3. The flexible multi-layer sensing surface according to claim 1, wherein the first flexible sensing layer comprises a capacitive sensing electrode array.

4. The flexible multi-layer sensing surface according to claim 1, wherein the second flexible layer comprises an array of RF antennas.

5. The flexible multi-layer sensing surface according to claim 1, wherein the one or more stored parameters comprises a parameter indicating whether the sensing surface is fully or partially unrolled.

6. The flexible multi-layer sensing surface according to claim 1, wherein the second flexible layer is both flexible and stretchable.

7. The flexible multi-layer sensing surface according to claim 1, further comprising a filler layer between the first flexible sensing layer and second flexible layer.

8. The flexible multi-layer sensing surface according to claim 7, wherein the first flexible sensing layer, filler layer and second flexible layer are bonded together to form a single composite layer.

9. The flexible multi-layer sensing surface according to claim 8, further comprising:
an upper filler layer and a lower filler layer formed from an elastic material, and wherein the single composite layer is positioned between the upper filler layer and the lower filler layer, all the layers are joined together by the second part along only one edge and the upper filler layer and the lower filler layer are joined together along at least one other edge.

10. The flexible multi-layer sensing surface according to claim 7, further comprising:
an upper filler layer and a lower filler layer formed from an elastic material, and wherein the first flexible sensing layer, filler layer and second flexible layer are positioned between the upper filler layer and the lower filler layer, all the layers are joined together by the second part along only one edge and the upper filler layer and the lower filler layer are joined together along at least one other edge.

11. The flexible multi-layer sensing surface according to claim 1, comprising a flexible sensing mat and a rigid portion, wherein the flexible sensing mat comprises the first flexible sensing layer and the second flexible layer and the rigid portion comprises the calibration module.

12. A flexible sensing surface comprising:
a first flexible sensing layer;
a second flexible layer comprising a second flexible sensing layer or a flexible output layer; and
a rigid portion comprising a calibration module arranged to use the first flexible sensing layer to detect a relative position of the first flexible sensing layer and the second flexible layer and to update one or more stored operating parameters based, at least in part, on the detected relative position;
an upper filler layer and a lower filler layer formed from an elastic material;
a single composite layer positioned between the upper filler layer and the lower filler layer; and
wherein all the layers are joined together along one edge by the rigid portion, and the upper filler layer and the lower filler layer are joined together along at least one other edge.

13. The flexible sensing surface according to claim 12, wherein the calibration module is arranged to drive a signal into the second flexible layer while detecting the relative position of the first flexible sensing layer and the second flexible layer.

14. The flexible sensing surface according to claim 12, wherein the first flexible sensing layer comprises a capacitive sensing electrode array.

15. The flexible sensing surface according to claim 12, wherein the second flexible layer comprises an array of RF antennas.

16. The flexible sensing surface according to claim 12, wherein the one or more stored parameters comprises at least one offset parameter specifying a change in relative position of the first flexible sensing layer and the second flexible layer.

17. The flexible sensing surface according to claim 12, wherein the one or more stored parameters comprises a parameter indicating whether the sensing surface is fully or partially unrolled.

18. A flexible multi-layer sensing surface comprising:
a first flexible sensing layer;
a second flexible layer comprising a second flexible sensing layer or a flexible output layer, wherein the second flexible layer is an elastic piece of fabric; and
a rigid portion comprising a calibration module arranged to use the first flexible sensing layer to detect a relative position of the first flexible sensing layer and the second flexible layer and to update one or more stored operating parameters based, at least in part, on the detected relative position; and
wherein the first flexible sensing layer and the second flexible layer are joined together by the rigid portion along only one edge.

19. The flexible multi-layer sensing surface according to claim 18, wherein the calibration module is arranged to drive a signal into the second flexible layer while detecting the relative position of the first flexible sensing layer and the second flexible layer.

20. The flexible multi-layer sensing surface according to claim 18, wherein the second flexible layer comprises an array of RF antennas.

* * * * *